US008127262B1

(12) United States Patent
James-Roxby et al.

(10) Patent No.: US 8,127,262 B1
(45) Date of Patent: Feb. 28, 2012

(54) COMMUNICATING STATE DATA BETWEEN STAGES OF PIPELINED PACKET PROCESSOR

(75) Inventors: Philip B. James-Roxby, Longmont, CO (US); Michael E. Attig, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 547 days.

(21) Appl. No.: 12/337,886

(22) Filed: Dec. 18, 2008

(51) Int. Cl.
*G06F 17/50* (2006.01)

(52) U.S. Cl. ........ 716/110; 716/118; 716/101; 716/104; 716/103

(58) Field of Classification Search .................. None
See application file for complete search history.

(56) References Cited

U.S. PATENT DOCUMENTS

| | | | | |
|---|---|---|---|---|
| 5,887,160 | A * | 3/1999 | Lauritzen et al. | 712/222 |
| 6,546,542 | B2 * | 4/2003 | Yumoto et al. | 716/103 |
| 6,629,312 | B1 * | 9/2003 | Gupta | 717/136 |
| 6,836,808 | B2 * | 12/2004 | Bunce et al. | 710/20 |
| 6,853,970 | B1 * | 2/2005 | Gupta et al. | 703/20 |
| 7,036,106 | B1 * | 4/2006 | Wang et al. | 716/104 |
| 7,181,594 | B2 * | 2/2007 | Wilkinson et al. | 712/11 |
| 7,484,079 | B2 * | 1/2009 | Gupta et al. | 712/220 |
| 7,649,879 | B2 * | 1/2010 | Parker | 370/389 |
| 7,784,014 | B1 * | 8/2010 | Brebner et al. | 716/104 |
| 7,792,117 | B1 * | 9/2010 | Keller et al. | 370/392 |
| 7,817,657 | B1 * | 10/2010 | Attig et al. | 370/419 |
| 7,889,780 | B2 * | 2/2011 | Leimer | 375/147 |
| 7,990,867 | B1 * | 8/2011 | Keller et al. | 370/235 |
| 2002/0023250 | A1 * | 2/2002 | Yumoto et al. | 716/1 |
| 2004/0088520 | A1 * | 5/2004 | Gupta et al. | 712/1 |
| 2004/0088529 | A1 * | 5/2004 | Schreiber et al. | 712/245 |
| 2006/0085781 | A1 * | 4/2006 | Rapp et al. | 716/17 |
| 2007/0277130 | A1 * | 11/2007 | Lavelle | 716/4 |
| 2009/0177876 | A1 * | 7/2009 | Wang et al. | 713/1 |

OTHER PUBLICATIONS

Michael Attig et al., Systematic Characterization of Programmable Packet Processing Pipelines, 14th Annual IEEE Symposium on Field-Programmable Custom Computing Machines, pp. 195-204, Apr. 2006.*

(Continued)

*Primary Examiner* — Leigh Garbowski
*Assistant Examiner* — A. M. Thompson
(74) *Attorney, Agent, or Firm* — LeRoy D. Maunu; Lois D. Cartier

(57) ABSTRACT

Approaches for generating a specification of a pipelined packet processor. A textual specification includes input and output packet formats, each specifying a format for each field in the packet and a plurality of actions for processing one or more fields of an input packet. Pipeline stages are determined from the actions in the textual specification, and each action is assigned to one of the pipeline stages. A shared variable is determined that is accessed by actions in at least two stages. An action in an initial stage writes the shared variable, an action in a last stage reads the shared variable. A hardware description is generated including the pipeline stages and assigned actions, a respective first-in-first-out queue between each adjacent pair of pipeline stages, a respective register for transferring the shared variable between each adjacent pair of the pipeline stages, and control logic for writing to and reading from each respective register.

19 Claims, 6 Drawing Sheets

OTHER PUBLICATIONS

Cristian Soviani, High Level Synthesis for Packet Processing Pipelines, Computer Science Technical Report Series, 151 pages, 2007.*
Shiro et al., A Processor Generation Method from Instruction Behavior Description Based on Specification of Pipeline Stages and Functional Units, Proceedings of the 2007 Asia and South Pacific Design Automation Conference, pp. 286-291, Jan. 2007.*
Xilinx, Inc.; U.S. Appl. No. 11/799,860 by Keller et al. filed May 3, 2007.
Xilinx, Inc.; U.S. Appl. No. 11/799,897 by Brebner et al. filed May 3, 2007.
Xilinx, Inc.; U.S. Appl. No. 11/799,898 by Keller et al. filed May 3, 2007.
Xilinx, Inc.; U.S. Appl. No. 11/799,953 by James-Roxby et al. filed May 3, 2007.
Xilinx, Inc.; U.S. Appl. No. 11/799,966 by Keller et al. filed May 3, 2007.

* cited by examiner

```
202 ── element IPOptionizer {
        ┌── // Ports
204  ──┤    input packetin : Packet;
        │    output packetout : Packet;
        └── output memoryreq : MemoryAccess;
        ┌── // Ethernet MAC + LLC + SNAP header
        │   format header = ( pad : 16,
        │         source : 48,
        │         destination : 48,
        │         length : 16,
        │         LLC : 24,
        │         SNAP : 40
        │   );
        │   // IP encapsulated in Ethernet packet
        │   format IPpacket = ( Ethernet : header,
        │         version : 4,
        │         hlen : 4,
        │         TOS : 8,
        │         length : 16,
        │         id : 16,
206 ──┤        flags : 3,
        │         offset : 13,
        │         TTL : 8,
        │         protocol : 8,
        │         checksum : 16,
        │         source : 32,
        │         destination : 32,
        │         payload : *
        │   );
        │   // Memory data format – some sort of IP options field
        │   format optionfield = ( flag : 1,
        │         class : 2,
        │         number : 5,
        │         length : 16,
        │         data : 104
        └── );
207  ┌── // Global variable (initialization not shown)
     └── var default : 8;
        ┌── // Packet processing example
        │   handle IPpacket on packetin {
        │   210 ── var memorydata : optionfield;
        │   212 ── set TTL = TTL – 1;
208 ──┤ 213 ── set checksum = default;
        │   214 ── read memorydata from memoryreq [ id ];
        │   216 ── [ version == 4 ] insert memorydata after destination;
        │   218 ── forward on packetout;
        └── }
        }
```

FIG. 2

COMMUNICATING STATE DATA BETWEEN STAGES OF PIPELINED PACKET PROCESSOR

FIELD OF THE INVENTION

The present invention generally relates to a pipelined packet processor, and more particularly relates to communicating state data between stages of a pipelined packet processor.

BACKGROUND

A packet processor inputs a stream of packets, manipulates the contents of the packets, and outputs another stream of modified network packets. The particular manipulations may implement a specific protocol for processing network packets, such as a protocol layer of a communication protocol, and for a high-level packet received from a higher protocol layer and delivered to a lower protocol layer for eventual transmission on the communication media. The manipulations may encapsulate the high-level packet within a low-level packet of the lower protocol layer.

The particular manipulations of packet data may be pipelined in order to increase throughput of the packet processor. The pipeline would typically include multiple stages, each stage performing one or more of the manipulations. First-in-first-out queues may be used between stages of the pipeline for buffering of the packet data.

State data associated with the manipulations of the packet data may need to be shared between pipeline stages. Sharing state data between pipeline stages may be accomplished using shared memory schemes with semaphores, lock mechanisms, and so forth. However, such mechanisms may be costly to implement in terms of required hardware resources and design efforts.

The present invention may address one or more of the above issues.

SUMMARY

The various embodiments of the invention provide methods and apparatus for generating a specification of a pipelined packet processor. In one approach, a method includes inputting a textual specification including an input packet format and an output packet format for packets input to and output from the packet processor. The input packet format and output packet format include a format for each field in the input packet and output packet, respectively, and the specification further includes a plurality of actions for processing one or more of the fields of the input packet. The method determines a plurality of pipeline stages from the actions in the textual specification. Each of the plurality of actions is assigned to a corresponding one of the plurality of pipeline stages. At least one shared variable is determined from the textual specification. Each shared variable is accessed by actions in at least two of the stages. For an initial and a last of the at least two stages, at least one action in the initial stage writes the shared variable and at least one action in the last stage reads the shared variable. The method generates and stores a hardware description that includes the plurality of pipeline stages and assigned actions, a respective first-in-first-out (FIFO) queue between each adjacent pair of pipeline stages, a respective register for transferring the shared variable between each adjacent pair of the pipeline stages between the initial stage and the last stage, and control logic for writing to and reading from each respective register.

An article of manufacture includes a processor-readable storage device configured with instructions for generating a specification of a pipelined packet processor. Execution of the instructions by one or more processors causes the one or more processors to perform operations including inputting a textual specification including an input packet format and an output packet format for packets input to and output from the packet processor. The input packet format and output packet format include a format for each field in the input packet and output packet, respectively, and the specification further includes a plurality of actions for processing one or more of the fields of the input packet. The operations further include determining a plurality of pipeline stages from the actions in the textual specification. Each of the plurality of actions is assigned to a corresponding one of the plurality of pipeline stages. At least one shared variable is determined from the textual specification. Each shared variable is accessed by actions in at least two of the stages. For an initial and a last of the at least two stages, at least one action in the initial stage writes the shared variable and at least one action in the last stage reads the shared variable. The operations further include generating and storing a hardware description that includes the plurality of pipeline stages and assigned actions, a respective first-in-first-out (FIFO) queue between each adjacent pair of pipeline stages, a respective register for transferring the shared variable between each adjacent pair of the pipeline stages between the initial stage and the last stage, and control logic for writing to and reading from each respective register.

In another embodiment, a pipeline packet processor is provided. The processor includes a plurality of stages. Each stage includes one or more processing elements for performing corresponding actions on each packet. The actions of at least two of the stages access a shared variable, and for an initial and a last one of the at least two stages, the one or more actions of the initial stage write the shared variable and one or more actions of the last stage read the shared variable. The processor further includes a plurality of first-in-first-out (FIFO) queues. A respective one of the FIFO queues is coupled between each adjacent pair of the plurality of stages for transferring packets between the stages. A respective register is coupled between each adjacent pair of the stages from the initial stage to the last stage for transferring the shared variable between each adjacent pair of stages. The processor further includes control logic for writing the shared variable to and reading the shared variable from each respective register. The control logic delays writing of a current value of the shared variable to the respective register between first and second stages of an adjacent pair of the pipeline stages, until after a last action of one or more actions in the first stage that write to the shared variable has written to the shared variable, and until after a first action of one or more actions in the second stage that read a previous value of the shared variable from the respective register has read the previous value from the respective register.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which:

FIG. 2 is a listing of an example textual language specification of a packet processor, in accordance with various embodiments of the invention;

DETAILED DESCRIPTION OF THE DRAWINGS

Figure 1:
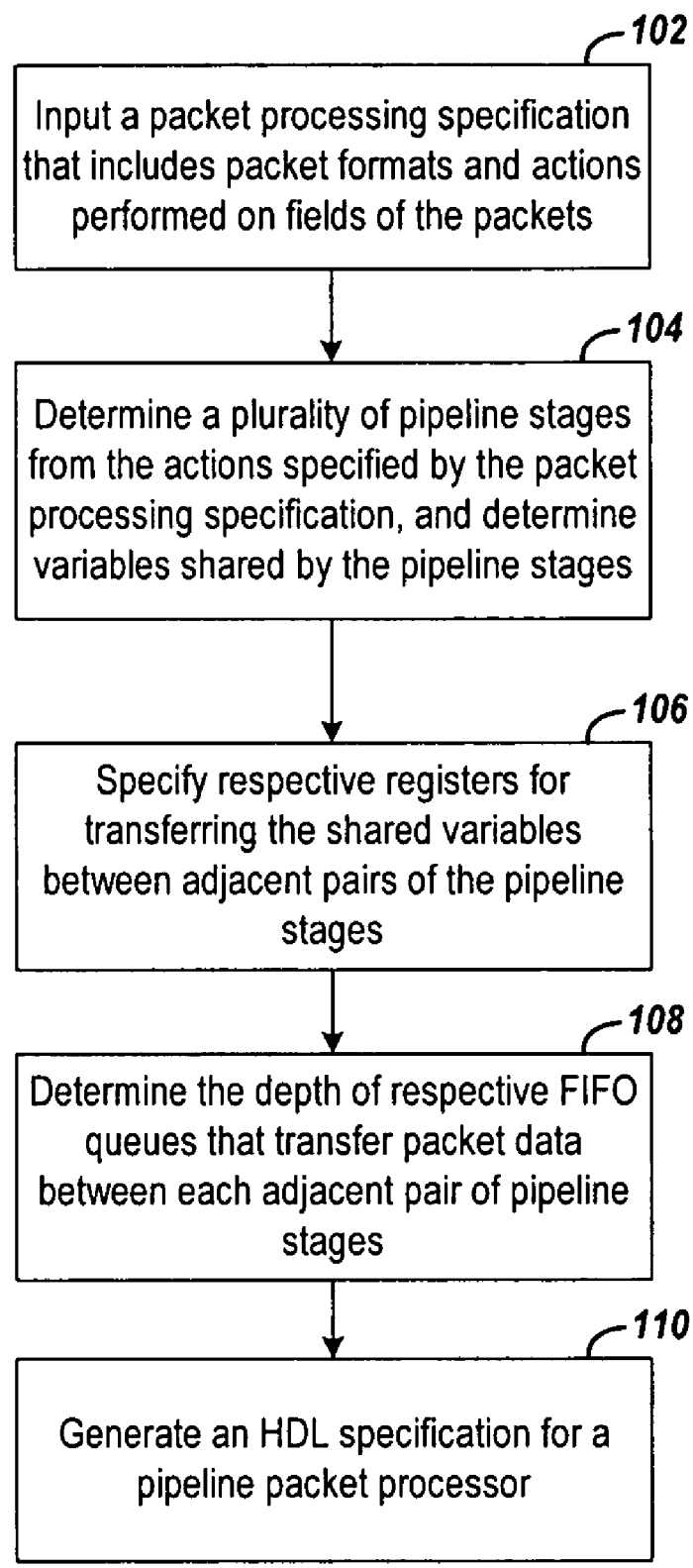
FIG. 1 is a flowchart of a process for generating a hardware description language (HDL) description of a pipelined packet processor, in accordance with various embodiments of the invention.

The various embodiments of the invention convert a high-level language specification of a packet processor into a hardware description language (HDL) of a pipelined packet processor, which includes forwarding state data between pipeline stages. The high-level language specification, which is not HDL, specifies an input packet format and an output packet format for packets input to and output from the packet processor. In addition, the high-level language specification defines the actions or operations to be performed on or with the fields of the input packet.

The HDL specification of the packet processor specifies a series of serially connected stages in a pipeline that processes a serial stream of data, with each of the pipeline stages performing one or more actions on or with the fields of an input packet. The pipeline typically includes multiple stages separated by first-in-first-out queues, which are used for buffering packet data between stages of the pipeline. In such a pipeline, it may be necessary to share state data associated with the manipulations of the packet data between pipeline stages in addition to the main flow of packets through the pipeline.

By taking into account a number of factors, the embodiments of the present invention construct the pipeline stages and state data sharing structure automatically from the high-level language description. One factor to be considered is that state data need only be moved forward through the pipeline and not backward. Forwarding arises in a pipeline system for a number of reasons, for example, the existence of deadlines. If an operation cannot be scheduled to meet a deadline, then the operation is moved into a subsequent pipeline stage, and the packet is delayed between stages in order to ensure that all data for the operation is available on time. In this situation, the context needed to perform the operation is forwarded to the subsequent stage.

Another reason for forwarding is the existence of architectural constraints. For example, an implementation may require that insert and remove operations on packet fields be performed as the last stages of the pipeline, regardless of where the insert or remove operation was declared in the high-level description. This requires the context surrounding the operation to be captured and forwarded through the pipeline to the stage in which the operation is performed. An additional reason to use forwarding is that multiple operations may use the same variable, and for dependency or scheduling reasons, these operations may not be able to exist in the same pipeline stage. Thus, the shared variable needs to be forwarded between stages for use by each of these multiple operations.

Yet another factor to be considered is that all processing inside of a pipeline stage is deterministic with regard to a single time reference. For example, the pipeline stages can be controlled by a single counter that indicates which word of the packet is currently being processed. The word number in process is called the "schedule," and can be used as the single time reference used in the state data forwarding structure. Using the single time reference, the time at which state data is written can be unambiguously determined from the high-level description, and the time at which all state data has been read and can be discarded can also be unambiguously determined from the high-level description.

FIG. 1 is a flowchart of a process for generating an HDL description of a pipelined packet processor, in accordance with various embodiments of the invention. The general processing of network packets is specified in a high-level language specification (a language other than a hardware description language (HDL)), and from this specification a pipeline packet processor is automatically specified in an HDL.

The high-level language specification of the packet processor is input at step 102. A plurality of pipeline stages are determined, at step 104, from the specified actions, and each of the actions is assigned to one of the pipeline stages. Along with determining the pipeline stages, the process determines those variables that are shared between pipeline stages. For each variable that is accessed (i.e., read or written) by two or more stages, if the stage in which the variable is written precedes the stage in which the same variable is read, then the variable will need to be forwarded.

At step 106, a respective register is specified for each shared variable. A respective register is used to transfer the shared variable between each adjacent pair of pipeline stages between the first stage that accesses the shared variable and the last stage that accesses the shared variable. The depth of a respective first-in-first-out (FIFO) queue for transferring the packet data between each adjacent pair of pipeline stages is determined at step 108.

At step 110, an HDL specification for the pipelined packet processor is generated. The HDL specification includes the plurality of pipeline stages and the actions assigned to each stage, the respective FIFO queues for transferring packet data between each adjacent pair of the pipeline stages, the respective registers for transferring the shared variables between each adjacent pair of the pipeline stages between the first and last stages, and control logic for writing to and reading from each respective register by the pipeline stages.

Those skilled in the art will recognize that additional design tools may be used to generate a hardware implementation, for example, on an application specific integrated circuit (ASIC) or a programmable logic device, from the pipeline packet processor from the generated specification.

FIG. 2 is a listing of an example textual language specification of a packet processor in accordance with various embodiments of the invention. Various embodiments of the invention may translate the example textual language specification into a pipelined network packet processor that processes network packets as specified, with registers being used to forward the required variables between stages of the pipeline. The specification includes a declaration 202 of the name of the network packet processor, a declaration 204 of the ports of the network packet processor, a declaration 206 of formats of types of network packets and other data structures, a declaration 207 of a global variable, and a specification 208 of a handler procedure for processing the network packets by the network packet processor.

As specified in ports declaration 204, the network packet processor has an input port with identifier "packetin" for receiving network packets, an output port with identifier "packetout" for transmitting network packets, and a memory port with identifier "memoryreq" for accessing an external memory. As specified in the handler specification 208, the network packets received at the input port are modified and the modified network packets are transmitted from the output port. Certain of the received network packets are modified using data that is read from an external memory using the memory port. It will be appreciated that a network packet may also be modified using state data that is stored within the network packet processor.

The handler specification 208 specifies processing of network packets that have type "IPpacket" and are received at the input port "packetin." The handler specification 208 includes a declaration 210 of a local variable "memorydata" and specifications of five actions, including set action 212, set action 213, memory read action 214, insert action 216, and forwarding action 218. In one embodiment, these actions are performed in different stages of the pipeline that is generated responsive to the textual language specification. In such a case, registers are used to forward variable "memorydata" between the first and last stages in which the variable is used.

For each network packet of type "IPpacket" that is received at the input port "packetin," set action 212 decrements the "TTL" field of the network packet. Set action 213 sets the value of the "checksum" field to a value of the global variable of declaration 207. Memory read action 214 reads a memory at the address given by the "id" field of the network packet. The insert action 216 includes a guard condition within the square brackets that enables the insert action 216 when the "version" field of the network packet has a value of 4, and otherwise the insert action 216 is disabled. If the insert action 216 is enabled by the guard condition, the insert action 216 inserts data from the memory read action 214 after the "destination" field of the network packet. Forwarding action 218 transmits the modified network packet at the output port "packetout."

The IPpacket format and actions 214 and 216 may be used to illustrate the process by which it is determined that the variable memorydata must be forwarded (FIG. 1, step 104). The variable "memorydata" cannot be written until the "id" field is determined from the incoming packet. However, "memorydata" must be written directly after the "destination" field, which precedes the "id" field. Therefore, it is necessary to forward the "id" field between stages so it can be used to determine the new value of "memorydata" to be inserted following the "destination" field.

The value of the global variable of declaration 207 could be updated by a handler procedure during the processing of one network packet, and the updated value could be used during the processing of another network packet by the handler procedure. Thus, the global variable of declaration 207 may provide state data that is preserved between network packets. In contrast, the local variable of declaration 210 may be temporary data that should be reinitialized for each network packet that is processed.

The textual language for specifying the processing of a network packet handler may closely correspond to the techniques that a designer uses to specify a communication protocol. The designer of a communication protocol may develop the textual language specification without having the specialized knowledge required to develop an integrated circuit, and various embodiments of the invention may translate the textual language specification of a communication protocol into an efficient implementation of the communication protocol in a network packet processor. Thus, various embodiments of the invention permit a designer of a communication protocol to develop an integrated circuit for efficiently implementing the communication protocol, even though the designer does not have the skills for designing an integrated circuit.

Figure 3:
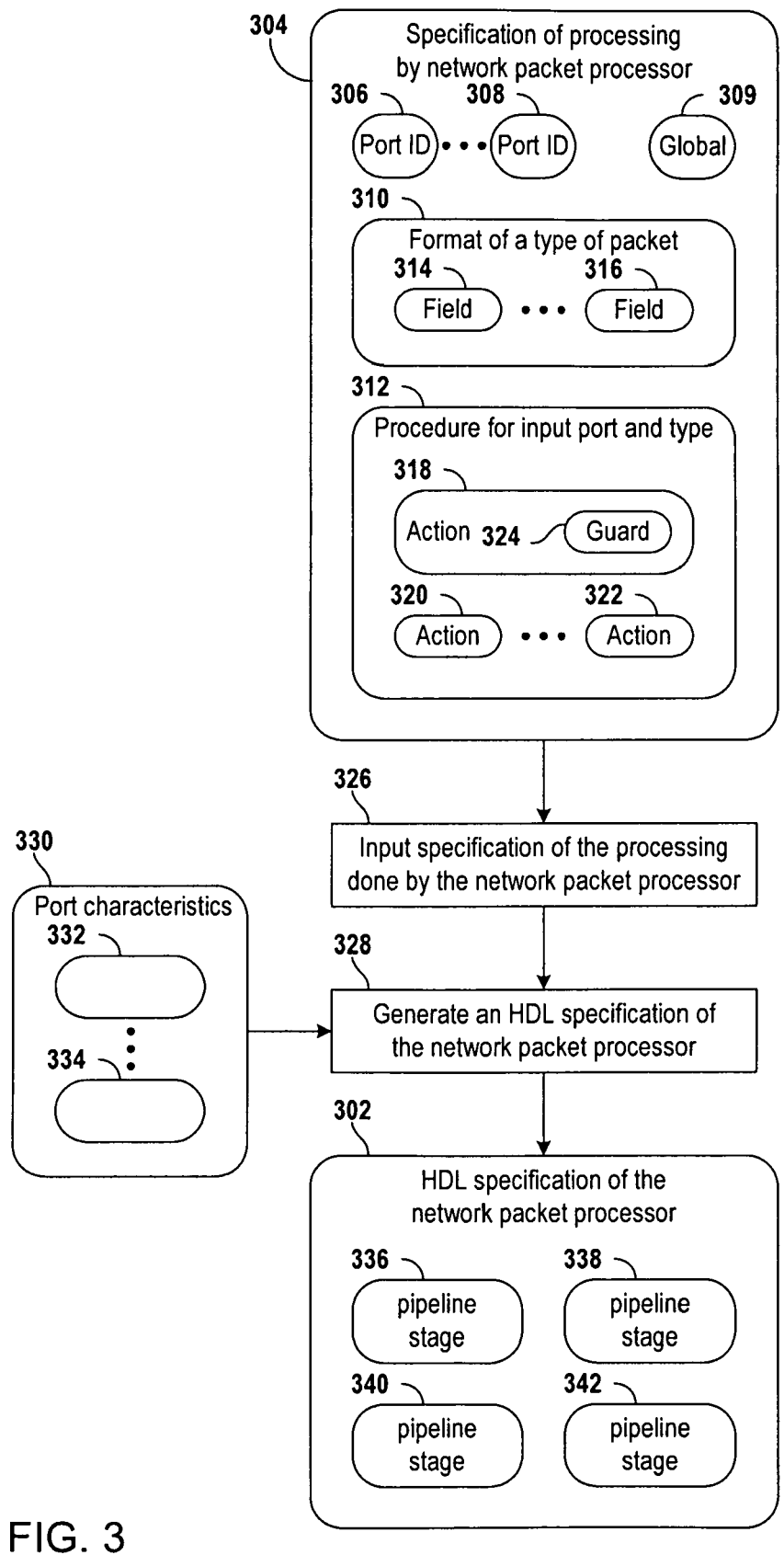
FIG. 3 is a data flow diagram of a process of generating an HDL specification of a network packet processor, in accordance with various embodiments of the invention.

FIG. 3 is a data flow diagram of a process of generating a hardware description language (HDL) specification 302 of a network packet processor in accordance with various embodiments of the invention. The HDL specification 302 may be generated from a textual language specification 304 of the processing performed by the network packet processor.

The textual language specification 304 of the network packet processor may include port identifiers 306 and 308, global variables 309, a format or formats 310 for one or more types of network packets and possibly other data structures, and a procedure 312 for each input port and each type of network packet that is expected at the input port of the network packet processor. The port identifiers 306 and 308 may include respective identifiers for the input, output, and any memory ports of the network packet processor. The global variables 309 may provide state data that is preserved between network packets. A format 310 includes the fields 314 and 316 of a type of network packet, and a field 314 or 316 may be declared in the format 310 as having a specified name and a specified size, such as a number of data bits of the field. The fields 314 and 316 may be specified in format 310 in an order corresponding to an order of the network packet manager receiving or transmitting the fields in the type of network packets.

A procedure 312 may include actions 318, 320, and 322 for manipulating network packets of a particular type that are received at a particular input port. Examples for actions 318, 320, and 322 include, but are not limited to, a set action for setting a value of a field 314 as a function of global variables 309 and/or fields 314 and/or 316, an insert action for data insertion at a field 314 as a function of global variables 309 and/or fields 314 and/or 316, a remove action for data removal at field 314 as a function of global variables 309 and/or fields 314 and/or 316, an update action for updating one of the global variables 309 as a function of the global variables 309 and/or fields 314 and/or 316, a forward action for transmitting modified network packets from an output port of the network packet processor, a memory read action for reading a value from a memory, and a memory write action for writing a value to the memory.

An action 318 may include a guard condition 324 for enabling and disabling the action 318, with the action 318 being performed in response to the guard condition 324 being satisfied and the action 318 being bypassed in response to the guard condition 324 not being satisfied. Another action 320 might not include a guard condition and the action 320 may always be performed on each network packet that is processed using procedure 312. Examples for guard condition 324 include, but are not limited to, a check of a value of a field 314 of a type of the network packets, a comparison between two fields 314 and 316 of a type of the network packets, and a comparison between a field 314 and one of the global variables 309.

At step 326, the specification 304, which specifies the processing performed by the network packet processor, is input. At step 328, the HDL specification 302 of the network packet processor is generated. To generate the HDL specification 302 of the network packet processor, a specification 330 may be input that specifies the characteristics 332 and 334 of the ports having identifiers 306 and 308. Example port characteristics include, but are not limited to, width, signaling protocol, and burst length. In addition, port characteristics 330 may specify whether network packets are received in an interleaved manner by the network packet processor.

The generated HDL specification 302 may include multiple components corresponding to the pipeline stages. For example, there may be components 336, 338, 340, and 342 for four pipeline stages.

Figure 4:
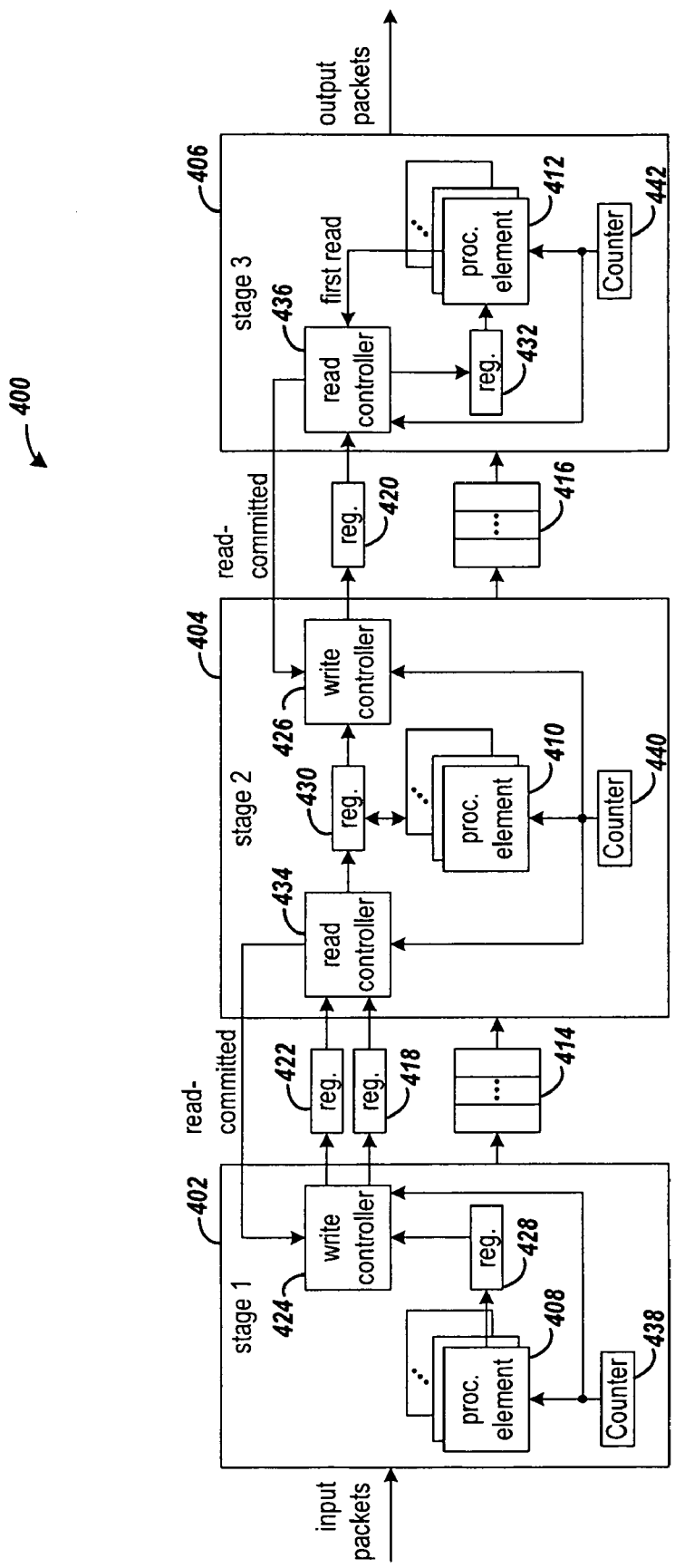
FIG. 4 is a block diagram of an example packet processor that is generated in accordance with various embodiments of the invention.

FIG. 4 is a block diagram of an example packet processor that is generated in accordance with various embodiments of the invention. The packet processor is a pipeline 400 that includes example stages 402, 404, and 406. The example pipeline 400 is shown as having three stages. Those skilled in the art will recognize that different designs are likely to have different numbers of stages. The stages of the pipeline 400 each include one or more processing elements 408, 410, and 412 that perform various operations on fields of input packets. The operations performed by the processing elements 408, 410, and 412 are those originally specified in the high-level description that was converted to HDL.

The pipeline stages 402, 404, and 406 are separated by FIFO queues 414 and 416 for buffering the packets as they pass between the stages 402, 404, and 406. In one embodiment, the depth of the queues 414 and 416 is matched to the processing performed by the stages, thus making it possible to meet any deadline irrespective of the natural ordering of data in the serial packet data stream.

The processing inside of a pipeline stage is deterministic, with regard to a single time reference. For example, each of the pipeline stages 402, 404, and 406 can be controlled by a single counter 438, 440, and 442 that indicates which word of the packet is currently being processed. As previously noted, the word number in process may be referred to as the "schedule" and can be used as the single time reference used in the state data forwarding structure. The counters 438, 440, and 442 have a fixed offset from each other, with the adjacent stages 402, 404, and 406 in the pipeline 400 being separated by fixed-depth FIFO queues 414 and 416.

The pipeline 400 includes registers 418, 420, and 422 that are used to forward variables between the stages 402, 404, and 406. A variable needs to be forwarded between stages if it is written in one stage and read in a subsequent stage. In the example pipeline 400, registers 418 and 420 are used to forward a first variable from stage 402 to stage 406, and register 422 is used to forward a second variable from stage 402 to stage 404 (but not to stage 406). In one scenario, the first variable is simply passed through stage 404 to register 420 without being accessed by stage 404. In another scenario, the first variable is used (e.g., either read, written, or both) by stage 404 prior to being forwarded to stage 406 through register 420. For illustration purposes, the pipeline 400 is shown as including only three registers 418, 420, and 422 that are used to forward two variables. It will be appreciated, however, that a pipeline for some other design would include a dedicated register for each variable that is forwarded between stages of the pipeline.

The first and second variables are forwarded between the stages 402, 404, and 406 by writing the variables to and reading the variables from the registers 418, 420, and 422. The forwarded variables are written to registers 418, 420, and 422 from stages 402 and 404 under the control of write controllers 424 and 426. Stage 406 is not illustrated as including a write controller, because stage 406, as the last stage, does not forward any variables. A variable is ready to be forwarded from one stage, for example stage 402, to the next stage when all writes to the variable, even a conditional write to the variable, by each processing element 408 of stage 402 have been completed. When the last write to the variable has been performed by processing element 408, the value of the variable is ready to be written from internal register 428 to register 418. The value of the variable cannot be written, however, until the next stage 404 indicates that the previous value of the forwarded variable has been read from register 418.

The stages 404 and 406 each include a read controller 434 and 436 that controls reading of the forwarded variables from the registers 418, 420, and 422 and coordinates with the write controller from the previous stage. The read controllers 434 and 436 each provide read-committed signals to the write controllers 424 and 426 of the previous stages of the pipeline, thereby indicating that the current value of a forwarded variable has been read from the registers 418, 420, and 422. The effect of committing the read is that once the value of the forwarded variable has been read from one of the registers 418, 420, and 422 and loaded into one of the internal registers 430 and 432, then the next value of the forwarded variable can be written to the register. It is possible to determine when the latest read of a forwarded variable will occur by looking at all possible reads from that variable for a given stage and selecting the time at which the earliest read occurs. At this point, the forwarded variable will be read from the forwarding register and then placed into local storage in the stage. Thus, the value in the forwarding register no longer needs to be preserved. For example, when read controller 436 of stage 406 performs the first read of the current value of the forwarded variable stored in register 420, the current value is loaded into the internal register 432 of stage 406 and the read controller 436 signals the write controller 426 of the previous stage 404 that the next value of the forwarded variable can be written to register 420.

The counter in each stage is coupled to the read and write controllers in the corresponding stage, so that those read and write controllers can signal when the first read and last write have completed. For example, in stage 1 (402), counter 438 is coupled to write controller 424. Based on the word of the packet in process in stage 1, the write controller knows if the last write to a variable has been performed. This information is determined at the time the pipeline stages and shared variables are determined from the input packet processing specification (FIG. 1, 104).

Figure 5:
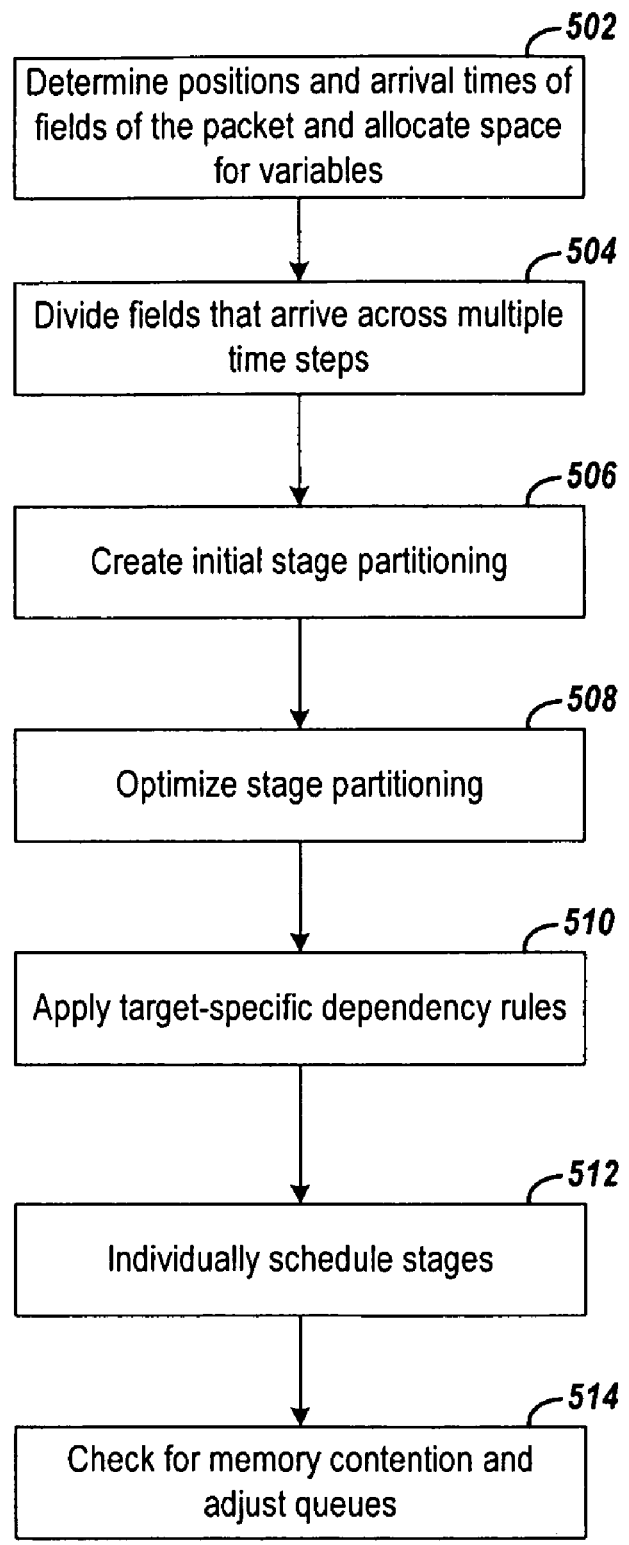
FIG. 5 is a flowchart of an example process for generating a pipeline including registers to pass shared variables between stages of the pipeline.

FIG. 5 is a flowchart of an example process for generating a pipeline including registers to pass shared variables between stages of the pipeline. The process begins in step 502 by calculating the position of and scheduled arrival time of each packet field in the input packet. Space is also allocated for any variables to be used. However, the scheduled arrival time is left empty initially.

In step 504, individual packet fields that arrive across multiple time steps are divided into smaller fields. The boundaries of these smaller fields align to the interface words. The division process assures that, internally, the packet fields to be manipulated arrive in a single time step, which aids in allocating internal buffering.

In step 506, an initial partitioning of actions into pipeline stages is produced based on action dependencies and packet field availability. It is in this step 506 that variable availability is first assigned, by examining the actions that write variables and initial variable forwarding needs are discovered.

The pipeline stage partitioning is refined in step 508 to improve the pipeline implementation mapping by shuffling actions between stages and adjusting schedules. Variable forwarding needs are adjusted based on the refined partition.

In step 510, implementation-specific constraints are incorporated into the pipeline by further refining action partitioning across stages. One example of this is the implementation requirement that packet field insertion be performed after all set actions. As a result, all insert actions are moved to pipeline stages that occur after all set actions. The state data associated with the insert is captured as a system variable and is forwarded from its original location in the pipeline to the stage in which the insertion is actually performed.

Once partitioning refinement and optimization have been performed, the actions are locked to a specific pipeline stage, and in step 512 each stage is scheduled. A schedule for a pipeline stage specifies the time step at which each action is performed. A schedule also finalizes the variable forwarding requirements of pipeline stages, such as when variables are read from forwarding registers and when variables are written to forwarding registers. Step 512 uses the variable read and write times to configure the sizes of FIFO queues between pipeline stages by ensuring that a variable is read in a stage only after it has been written by the previous stage. Each FIFO queue acts as a delay element.

Finally, in step 514 the pipeline stages are considered in tandem to determine if and when they access a shared external memory. If more than one pipeline stage attempts to access the same external memory in the same time step, delay is added to the FIFO queue(s) separating the stages to arbitrate the stages' access.

Figure 6:
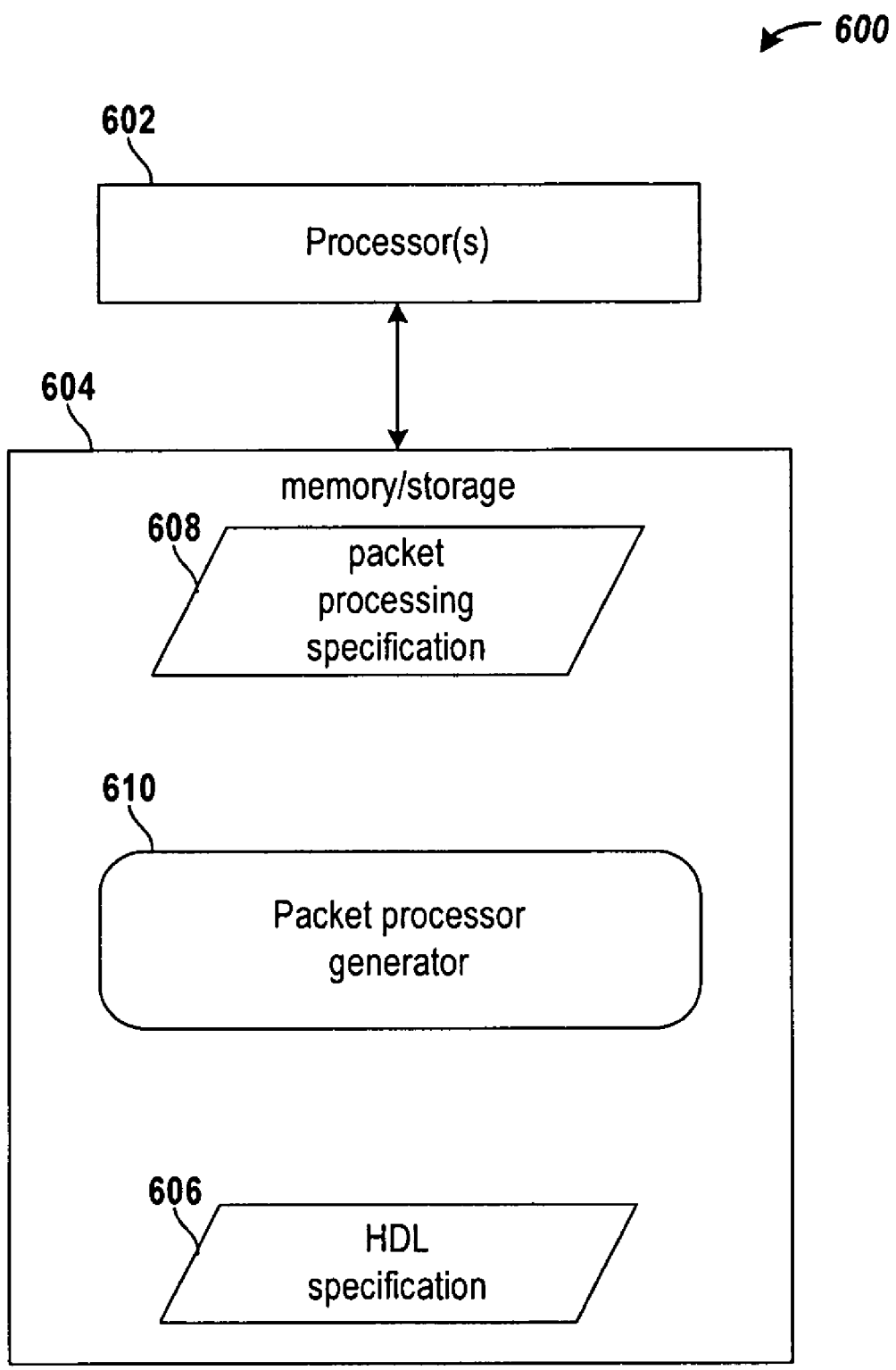
FIG. 6 is a block diagram of an example computing arrangement on which the processes described herein may be implemented.

FIG. 6 is a block diagram of an example computing arrangement on which the processes described herein may be implemented. Those skilled in the art will appreciate that various alternative computing arrangements, including one or more processors and a memory arrangement configured with program code, would be suitable for hosting the processes and data structures and implementing the algorithms of the different embodiments of the present invention. In addition, program code that implements the processes may be provided via a variety of computer-readable storage media or delivery channels such as magnetic or optical disks or tapes, electronic storage devices, or as application services over a network.

Computing arrangement 600 includes one or more processors 602 coupled to a memory/storage arrangement 604. The architecture of the computing arrangement depends on implementation requirements, as would be recognized by those skilled in the art. The processor 602 may be one or more general purpose processors, or a combination of one or more general purpose processors and suitable co-processors, or one or more specialized processors (e.g., RISC, pipelined, etc.).

The memory/storage arrangement 604 is representative of hierarchical storage commonly found in computing arrangements. Such hierarchical storage typically includes multiple levels of cache memory, a main memory, and local and/or remote persistent storage such as provided by magnetic disks (not shown). The memory/storage arrangement may include one or both of local and remote memory/storage, remote storage being coupled to the processor arrangement via a local area network, for example.

The processor arrangement 602 executes the software stored in memory/storage arrangement 604, and reads data from and stores data to the memory/storage arrangement according to the processes described above. An operating system (not shown) manages the resources of the computing arrangement. The memory 604 is configured with processor-executable instructions for causing the processor 602 to generate the HDL specification 606 for a network packet processor from an input packet processing specification 608. The HDL specifies the stages of the pipeline, the various functions performed by each of the stages and the registers that are connected between the stages for forwarding the required variables.

The instructions may be organized as one or more software modules, such as the packet processor generator 610 stored in the memory 604. The packet processor generator 610, as executed by the processor 602, performs the processes described herein. In performing these processes, the packet processor generator stores any intermediate data and final data in the memory 604.

The present invention is thought to be applicable to a variety of packet processing application. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method of generating a specification of a pipelined packet processor, comprising: inputting a textual specification including an input packet format and an output packet format for packets input to and output from the pipelined packet processor, the input packet format and output packet format including a format for each field in the input packet and output packet, respectively, and a plurality of actions for processing one or more of the fields of the input packet;

determining a plurality of pipeline stages from the actions in the textual specification, each of the plurality of actions assigned to a corresponding one of the plurality of pipeline stages;

wherein the plurality of pipeline stages includes at least three stages; determining at least one shared variable from the textual specification, each shared variable accessed by actions in at least two stages of the at least three stages, wherein for an initial stage and a last stage of the at least two stages, at least one action in the initial stage writes the shared variable and at least one action in the last stage reads the shared variable, and the initial and last stages are separated by an intermediate stage; and generating with a processor and storing in a storage arrangement, a hardware description that includes, the plurality of pipeline stages and assigned actions, a respective first-in-first-out (FIFO) queue between each adjacent pair of pipeline stages, a respective first register coupled to transfer the shared variable from the initial stage to the intermediate stage and a respective second register coupled to transfer the shared variable from the intermediate stage to the last stage, and control logic for writing to and reading from each respective register.

2. The method of claim 1, wherein the generating and the storing of the hardware description of the initial stage includes specifying the initial stage to produce the shared variable as a function of a plurality of fields of the packets.

3. The method of claim 1, wherein the generating and storing of the hardware description of the last stage includes specifying the last stage to read the shared variable for updating one of a plurality of fields of the packets.

4. The method of claim 1, wherein the generating and storing of the hardware description of the intermediate stage includes specifying the intermediate stage to both read and write the shared variable.

5. The method of claim 1, wherein the generating and storing of the hardware description of the intermediate stage includes specifying the intermediate stage to perform only one of reading and writing the shared variable.

6. The method of claim 1, wherein the generating and storing of the hardware description of the plurality of pipeline stages includes specifying the intermediate stage to neither read nor write the shared variable.

7. The method of claim 1, wherein the generating and storing of the hardware description of the control logic includes specifying the control logic write the shared variable to the respective first register and delay writing of a current value of the shared variable to the respective first register until after a last action of one or more actions in the initial stage has written to the shared variable.

8. The method of claim 7, wherein the generating and storing of the hardware description of the control logic includes specifying the control logic to write the shared variable to the respective first register and further delay writing of the current value of the shared variable to the respective first register until after a first action of one or more actions in the intermediate stage has read a previous value from the respective first register.

9. The method of claim 7, wherein:
the generating and storing of the hardware description further includes generating and storing a hardware description of a plurality of counters corresponding to the plurality of pipeline stages, respectively;
the generating and storing of the hardware description of the plurality of counters includes specifying each counter to count a word number of a packet in process in the respective stage;
the generating and storing of the hardware description of the control logic includes specifying the control logic to determine when the last action has written to the shared variable in the initial stage in response to a value of the corresponding counter of the initial stage; and
the generating and storing of the hardware description of the control logic includes specifying the control logic to determine when the first action has read the previous value from the respective first register in response to a value of the corresponding counter of the intermediate stage.

10. The method of claim 1, further comprising determining a depth of the respective FIFO queue for each adjacent pair of stages.

11. The method of claim 1, wherein the generating and storing of the hardware description includes generating the hardware description in a hardware description language (HDL).

12. An article of manufacture, comprising:
a processor-readable storage device configured with instructions for generating a specification of a pipelined packet processor, wherein execution of the instructions by one or more processors causes the one or more processors to perform operations including:
inputting a textual specification including an input packet format and an output packet format for packets input to and output from the pipelined packet processor, the input packet format and output packet format including a format for each field in the input packet and output packet, respectively, and a plurality of actions for processing one or more of the fields of the input packet;
determining a plurality of pipeline stages from the actions in the textual specification, each of the plurality of actions assigned to a corresponding one of the plurality of pipeline stages;
wherein the plurality of pipeline stages includes at least three stages; determining at least one shared variable from the textual specification, each shared variable accessed by actions in at least two stages of the at least three stages, wherein for an initial stage and a last stage of the at least two stages, at least one action in the initial stage writes the shared variable and at least one action in the last stage reads the shared variable, and the initial and last stages are separated by an intermediate stage; and
generating and storing a hardware description that includes, the plurality of pipeline stages and assigned actions,
a respective first-in-first-out (FIFO) queue between each adjacent pair of pipeline stages,
a respective first register coupled to transfer the shared variable from the initial stage to the intermediate stage and a respective second register coupled to transfer the shared variable from the intermediate stage to the last stage, and control logic for writing to and reading from each respective register.

13. The article of manufacture of claim 12, wherein the instructions configured on the processor-readable storage device include instructions that when executed cause the one or more processors to generate and store the hardware description that specifies that the initial stage produces the shared variable as a function of a plurality of fields of the packets.

14. The article of manufacture of claim 12, wherein the instructions configured on the processor-readable storage device include instructions that when executed cause the one or more processors to generate and store the hardware description that specifies that the last stage reads the shared variable for updating one of a plurality of fields of the packets.

15. The article of manufacture of claim 12, wherein instructions configured on the processor-readable storage device include instructions that when executed cause the one or more processors to generate and store the hardware description that specifies that the intermediate stage neither reads nor writes the shared variable.

16. The article of manufacture of claim 12, wherein the instructions configured on the processor-readable storage device include instructions that when executed cause the one or more processors to generate and store the hardware description that specifies that the control logic writes the shared variable to the respective register and delays writing of a current value of the shared variable to the respective register between first and second stages of an adjacent pair of the pipeline stages, until after a last action of one or more actions in the first stage that write to the shared variable has written to the shared variable, and until after a first action of one or more actions in the second stage that read a previous value of the shared variable from the respective register has read the previous value from the respective register.

17. The article of manufacture of claim 16, wherein the instructions configured on the processor-readable storage device include instructions that when executed cause the one or more processors to generate and store the hardware description that specifies:
a plurality of counters corresponding to the plurality of pipeline stages, respectively;
each counter counts a word number of a packet in process in the respective stage;
the control logic determines when the last action has written to the shared variable in the first stage in response to a value of the corresponding counter of the first stage; and
the control logic determines when the first action has read the previous value from the respective register in response to a value of the corresponding counter of the second stage.

18. The article of manufacture of claim 12, wherein the instructions configured on the processor-readable storage device includes instructions that when executed cause the one or more processors to generate and store the hardware description in a hardware description language (HDL).

19. A pipeline packet processor, comprising: a plurality of stages including at least three stages, each stage including one or more processing elements for performing corresponding actions on each packet, wherein the actions of at least two of the stages access a shared variable, and for an initial stage and a last stage of the at least two stages, the one or more actions of the initial stage write the shared variable and one or more actions of the last stage read the shared variable, and the initial and last stages are separated by an intermediate stage;
- a plurality of first-in-first-out (FIFO) queues, wherein a respective one of the FIFO queues is coupled between each adjacent pair of the plurality of stages for transferring packets between the stages;
- a respective first register coupled between the initial stage and the intermediate stage for transferring the shared variable from the initial stage to the intermediate stage, and a respective second register coupled between the intermediate stage and the last stage for transferring the shared variable from the intermediate stage to the last stage; and control logic for writing the shared variable to and reading the shared variable from each respective register, wherein the control logic delays writing of a current value of the shared variable to the respective register between first and second stages of an adjacent pair of the pipeline stages, until after a last action of one or more actions in the first stage that writes to the shared variable has written to the shared variable, and until after a first action of one or more actions in the second stage that reads a previous value of the shared variable from the respective register has read the previous value from the respective register.

* * * * *